Aug. 21, 1928.

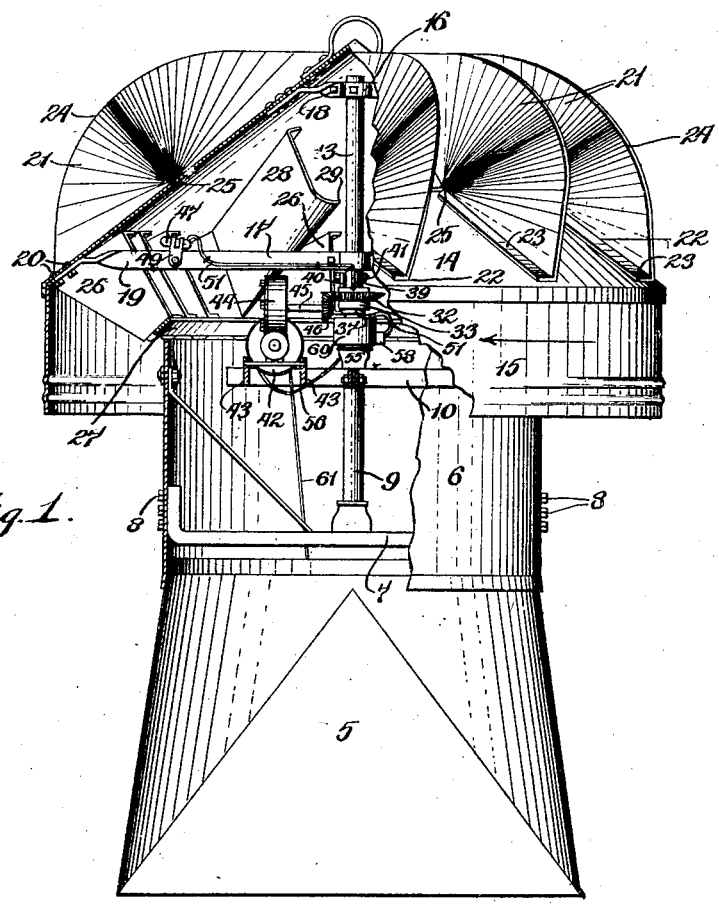

W. F. HIRSCHMAN

ROTARY VENTILATOR

Filed Aug. 10, 1926  3 Sheets-Sheet 2

1,681,343

Inventor
William F. Hirschman

By Popp & Powers
Attorneys

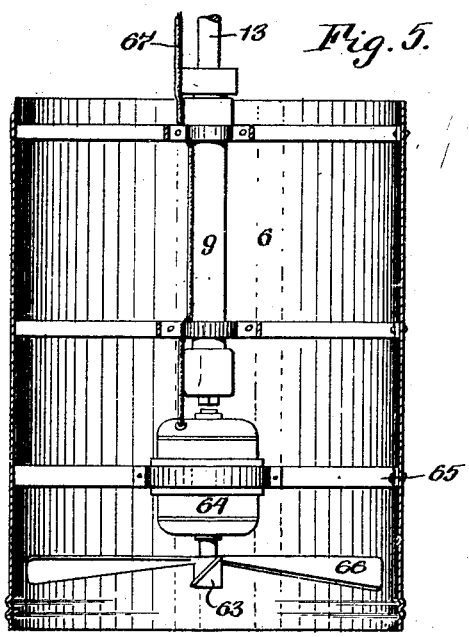
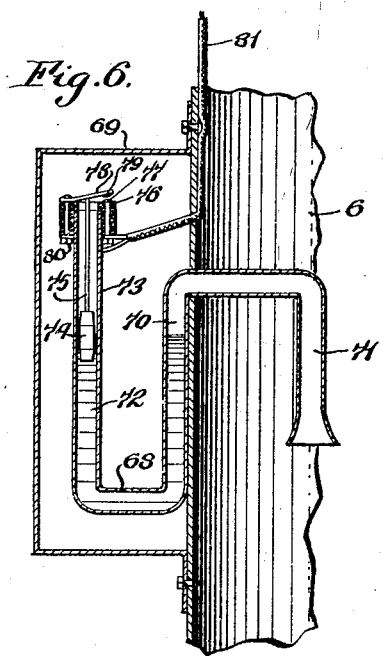
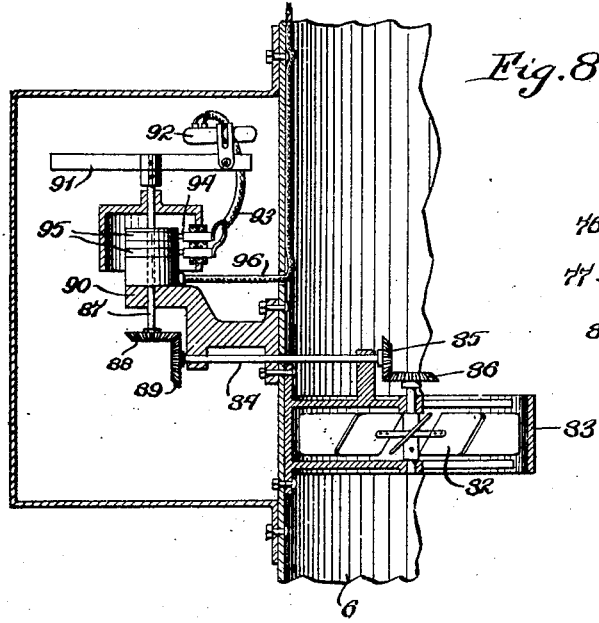
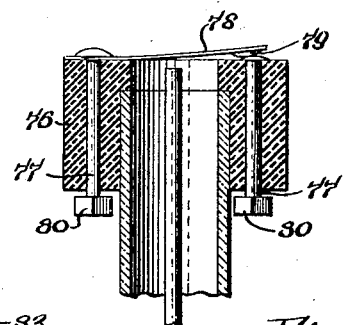

Patented Aug. 21, 1928.

1,681,343

UNITED STATES PATENT OFFICE.

WILLIAM F. HIRSCHMAN, OF LEROY, NEW YORK.

ROTARY VENTILATOR.

Application filed August 10, 1926. Serial No. 128,384.

This invention relates to a rotary roof ventilator which is adapted to utilize the pressure of the wind or air currents to draw out or suck objectionable gases or foul air from the building on which it is installed and discharge the same into the outer atmosphere. This invention is an improvement on the ventilator for which Letters Patent were granted to me on May 16, 1922, bearing the number 1,416,295, and on the ventilator for which I filed an application for patent, Serial No. 348, filed January 3, 1925.

It is the purpose of the invention to provide a rotary ventilator of this type in which is mounted a fan driven by an electric motor which is automatically energized when the velocity of the wind is insufficient to maintain a predetermined minimum speed and properly ventilate the building, and which is automatically stopped when the velocity of the wind increases sufficiently to drive the ventilator at a proper speed.

Further objects are to accomplish this purpose by means which are simple and not liable to get out of order, which do not impede the flow of foul air through the ventilator, and which are adaquately protected from the wind and rain.

Figure 3:
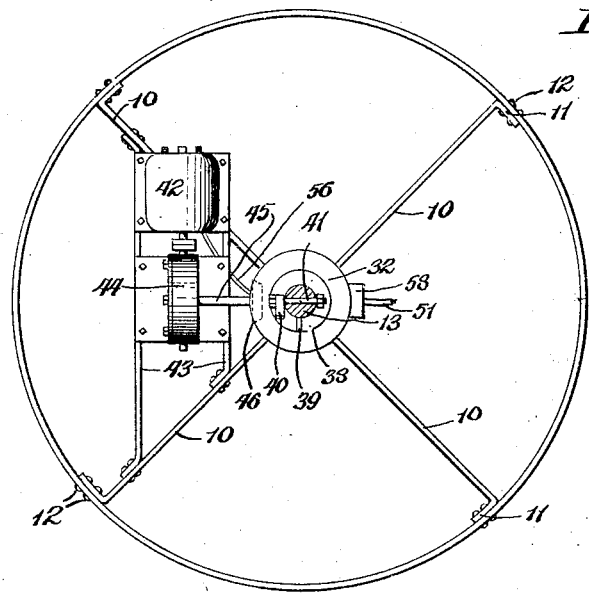
Figure 4:
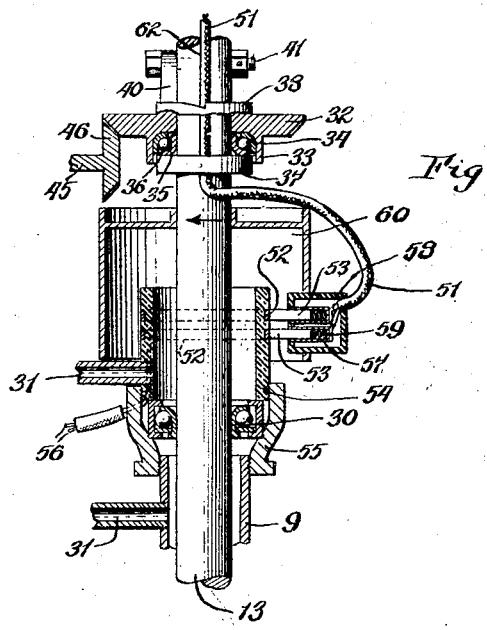

In the accompanying drawings:

Figure 1 is a side elevation of a ventilator and stack made in accordance with my invention, and showing a part of the same broken away and disclosing the interior thereof. Figure 2 is a longitudinal vertical section of the mercury tube switch which operates through the centrifugal force of the rotary turret to energize the motor when the wind drives the turret at an insufficient speed. Figure 3 is a horizontal section through the turret support-shaft and looking down upon the stack and the motor mounted thereon. Figure 4 is a vertical enlarged section through the turret supporting shaft showing a portion of the driving connection between the motor and this shaft. Figure 5 is a vertical section through the stack of a modified form of my ventilator. Figure 6 is a vertical fragmentary section of a switch controlled by the velocity of the air traveling through the stack. Figure 7 is an enlarged fragmentary sectional view thereof. Figure 8 is a vertical section showing another modified form of controlling switch mechanism.

Similar reference numerals indicate similar parts in each of the several figures of the drawings.

In its general organization this invention comprises a stack which carries a vertical shaft, a turret mounted on the shaft above the stack and having a plurality of propelling blades or vanes on its outer side, a motor carried by the stack and driving a fan, and a switch for operating said motor, which switch is actuated by means responsive to the velocity of the wind.

The ventilator is adapted to be placed on an exposed part of the roof of the house or building being ventilated and is mounted on an upwardly extending vent pipe 5 of the ventilating system (not shown) through which the foul air or objectionable gas is drawn out of the building and exhausted into the outside air.

In the preferred form of my invention shown in Figs. 1–4, the stack 6 is made in the form of a cylindrical sheet metal body and is adapted to fit over the vent pipe 5 and be secured thereto in any approved manner. The stack is braced at its lower end by a transverse channeled bar 7 which is secured to the diametrically opposite sides of the stack by bolts or rivets 8 passing therethrough. This bar also serves to support the post 9 upon which the turret and ventilating fan are supported. In the upper part of the stack are arranged cross braces 10 which are provided at their outer ends with flanges 11 which are adapted to be secured to the stack by rivets 12, and at their central portions these braces embrace the post 9 and are clamped thereto by suitable fastenings.

Within the post is arranged the vertical driving shaft 13 on the upper end of which the turret 14 is secured. The diameter of this turret is greater than the diameter of the stack 6 and vent pipe and is provided on its peripheral edge with a depending vertical flange or apron 15, the lower edge of which is lower than the upper edge of the stack 6, thereby preventing the entrance of rain and snow into the body of the ventilator. The means for securing the turret to the vertical driving shaft comprise an upper spider 16 and a lower spider 17 secured to each of these members and adapted to retain them in coaxial relation. Each of these spiders is composed of two sections the central parts of which are formed to receive the driving shaft and are bolted together by bolts 18. The arms 19 of each section are bent at an angle to the central part and are secured at their ends to the underside of the turret by bolts 20 or in any other suitable manner.

The rotation of the turret is accomplished by securing a number of spaced propeller buckets or blades 21 to the upper inclined face of the conical rotary turret. For substantially one-half of the rotation of the turret these propeller blades are traveling with the wind, of course, and the remaining half rotation against the wind. The construction of the blades when traveling with the wind obviously presents no difficulty, but to travel against the wind the blades must be designed so as to offer the minimum resistance to the air current. For this purpose each of the propeller blades has its forward or leading edge 22 disposed flush with the upper surface of the turret and is secured thereto by suitable forwardly extending flanges 23 while the main body of each blade extends rearwardly and upwardly from said leading edge and terminates in a trailing edge 24.

The central or body portion of each blade is pointed forming a forwardly and downwardly tapering bucket, the apex 25 of the same being arranged adjacent the upper surface of the turret. Since all of the blades or buckets are arranged in the same relation to the turret, the blades on one side of the turret present their concave sides to the wind while the blades on the other side present their convex sides. The turret, obviously, is rotated in the direction opposite to that direction in which the bucket shaped blades open, i. e., in the direction of the arrow, as shown in Figure 1, by reason of the greater resistance offered by the blades when arranged in that position than when arranged in the position the blades assume on the side of the turret going against the wind, i. e., when the buckets open in the direction of the wind current. This arrangement of the blades effectively rotates the turret even when the air current is of slight velocity, the action of the same being in accordance with accepted pneumatic-dynamic practice, the air current curling over the trailing edge 24 when the buckets travel against the wind and effectively killing the vacuum tending to form thereunder.

The suction of the foul air through the ventilating system and out between the apron 15 and the stack 6 is accomplished by securing a considerable number of suction blades 26 in a circumferential row on the lower inclined face of the rotary dome or turret 14. Each of these blades are inclined somewhat or arranged obliquely relatively to a perpendicular plane passing through the axis and through said suction blade so as to act in the manner of an ordinary propeller blade. Each of these suction blades is secured at its lower end to an annular stiffening ring 27 which is disposed just above and adjacent to the upper edge of the vent pipe 6, the adjacent faces of the stiffening ring and stack being substantially parallel to each other. To increase the efficiency of the fan, preferably two of the suction blades are extended inwardly toward the axis of the turret forming inner suction blades 28. The lower edge of each of these blades 28 is curved forwardly forming a lower advancing edge 29, thereby causing these blades to act as scoops, throwing the foul air upwardly and outwardly where it is finally expelled by the other suction blades of the fan.

The vertical central shaft 13 which carries the turret is supported within the post 9 by a plurality of annular ball bearings indicated at 30, of any usual and approved construction and at its lower end by a thrust bearing (not shown) which is preferably constructed in accordance with the application for patent for improvements in bearings filed by me July 2, 1926, Serial No. 120,058. The shaft and bearings preferably run in a bath of oil which may be supplied through conduits 31, 31 as shown in Fig. 4.

Above this post a beveled gear wheel 32 is mounted on the shaft 13 so as to freely rotate thereon. This gear wheel, as shown in Fig. 4 is provided with a depending annular flange 33 within which are arranged an outer annular race 34 which is L shape in cross section, a similar inner race 35 and a plurality of ball bearings 36 between these races. The inner race 35 rests upon a collar 37 which is pinned or otherwise suitably secured to the shaft 13. On its upper side this gear wheel is provided with a hub 38 having a notch 39 which is engaged by a dog or pawl 40 pivotally mounted on a pin 41 which extends diametrically through the shaft 13. The notch 39 is so shaped that when the shaft, under wind power, is traveling faster than the gear wheel 32, the dog will travel idly over the hub, but when the gear wheel is driven, the dog will engage the notch and rotate the shaft and the turret mounted thereon. By this means the electric motor is not turned when the ventilator is operating solely under wind pressure.

The motor 42 is mounted on a bed composed of two bars 43 which are suitably secured to the braces 10 supporting the upper part of the post 9. This motor drives a reducing worm gear 44 which is also mounted on the motor bed and which in turn drives a shaft 45 carrying a pinion 46 which meshes with and drives the gear wheel 32 when the motor is energized.

The means for energizing the motor when the velocity of the wind drives the turret at less than the desired minimum speed, includes a mercury tube switch which is mounted on one of the arms 19 of the spider 17 supporting the turret. This switch comprises a hermetically sealed tube 47 made of glass or other insulating material, which contains a quantity of mercury 48. This tube is mounted on the arm by a bracket 49 which is so mounted that the tube can be tipped to a greater or less extent. At its inner end two contacts 50, 50 are provided which are arranged within the tube and are adapted to be bridged, and the circuit thereby closed by the mercury. The leads 51 from these contacts are sealed in the glass and extend inwardly along the arm 19. It is apparent that when the tube is inclined outwardly and upwardly, the mercury tends to close the circuit and operate the motor. When, however, the turret is driven at a high speed by wind, the centrifugal force of the turret sends the mercury out, thereby breaking the circuit and de-energizing the motor.

The circuit between the revolving turret and the motor mounted on the stack includes a pair of contact rings 52 carried by the post 9, and a pair of brushes 53 engaging the same. The contact rings 52 are embedded in a fiber collar 54 which is secured within a cap 55 provided at the upper end of the post 9, and each ring is connected by a wire 56 to the motor 42. The brushes 53 are received in tubular metal sockets 57 which are set into a fiber box 58, and to each of the sockets is soldered one of the wires 51 leading through a groove 62 on the shaft 13 to the switch. The brushes are held in contact with the rings by springs 59. The fiber box 58 is supported in a collar 60 which is secured to the shaft 13 and overhangs the fiber collar 54 to prevent the entrance of dust and dirt into the post 9. The line or wire 61 supplying the current preferably connects with the motor and extends down the side of the stack and is connected to any suitable source of power within the building.

It is apparent from the foregoing description that while the turret is rotated rapidly by wind power, the mercury in the tube is held at the upper end thereof. When the wind dies down to a point where it does not drive the turret at a sufficient speed, the mercury falls back in the tube, closes the circuit and starts the motor. If the wind again picks up, the mercury is thrown to the outer end of the tube and the circuit is broken. If desired, a ridge or obstruction 98 may be placed in the tube to hold the mercury in the outer end of the tube until the turret travels at less than the speed it is driven by the motor and at the lower end until the wind drives the turret substantially faster than the motor driven speed.

In the modified form of my invention shown in Fig. 5 a separate electrically driven fan 63 is provided, and is adapted to be operated when the wind dies. In this form the stack 6 is made somewhat longer than in the preferred form, and at the lower end thereof below the post 9 which supports the turret an electric motor 64 is supported by arms 65. The shaft of the motor is arranged vertically and at the lower end thereof is mounted a fan 63 having radially extending blades 66 which are adapted to force the air up the stack when the motor is energized. This motor may be actuated by the switch shown in the preferred construction through wires 67 extending upwardly along the post 9, or it may be controlled by the velocity of the air travelling through the stack by means of one of the switch mechanisms shown in Figs. 6-8.

Various means may be employed for utilizing the velocity of the foul air traveling through the stack to actuate the switch controlling the motor. In the form shown in Figs. 6 and 7, a U-tube 68 is arranged on the exterior of the stack 6 within an enclosing casing 69, the inner branch 70 of which is extended inwardly through the stack and formed to provide a downward extension 71, which opens against the flow of air through the stack. The U-tube contains a quantity of liquid 72 having non-freezing and non-evaporating qualities, and in the outer branch 73 is arranged a float 74 actuating a vertical plunger 75. At the upper end of the tube is mounted a fiber collar 76 through which pass vertical bolts 77 on diametrically opposite sides of the tube, one of which passes through a flat spring 78 which carries a contact 79 adapted to engage the head of the other bolt 77. Each of the bolts 77 carries a nut 80 at its lower end and serves as a binding post for the wire 81 leading through the stack 6 to the motor. When the air is passing through the stack at low velocity, the switch is closed as shown in Fig. 7, and the motor operated. When the wind picks up and creates a greater flow through the stack a pressure is created at the inner end of the U-tube, which raises the float 74, and the contact 79 and breaks the circuit.

The controlling device shown in Fig. 8 comprises a small propeller 82 such as are employed in anemometers, which is mounted within a supporting rim 83 so as to be rotated by the air passing up the stack. The movement of this propeller is transmitted to a horizontal shaft 84 by a pair of beveled gear wheels 85, 86 which shaft extends to the exterior of the stack and rotates a vertical shaft 87, through beveled gear wheels 88, 89. Both of these shafts are suitably journaled in a bracket 90. A horizontal arm 91 is mounted on the upper end of the vertical shaft 87 and at one of its outer ends this arm carries a mercury tube switch 92 similar to the mercury tube switch 47 in the preferred construction, and in the same manner as in the preferred construction, a circuit is established between the switch and the motor by leads 93, brushes 94, contact rings 95 and a double wire 96 connected with the terminals of the motor.

In this construction, as the wind picks up and air is sucked more rapidly through the stack, the propeller 82 is revolved more rapidly which in turn revolves the arm 91 more rapidly and forces the mercury away from the contacts within the mercury tube switch thereby stopping the motor; and when the wind dies down, the propeller and arm are rotated less rapidly and the mercury tube closes and energizes the motor, thereby insuring a minimum ventilating effect at all times.

All of the several forms of this invention provide a rotary ventilator which operates continuously to ventilate the building regardless of the wind pressure. The electric motor, however, operates only a small fraction of the time and consequently uses but a small amount of current to secure this result. This result is also accomplished in a simple and effective manner, the parts are adequately protected from the weather, and the flow of air through the ventilator is not appreciably checked by the electric driving mechanism.

I claim as my invention:

1. In a ventilator, the combination of a revolving wind driven member, an electric motor, a ventilating fan driven by said motor, a switch mounted on said wind driven member and actuated by centrifugal force to deenergize said motor when said wind driven member is rotated faster than a predetermined speed and means for adjusting said switch to vary said predetermined speed.

2. In a ventilator, the combination of a revolving wind driven member, an electric motor, a ventilating fan driven by said motor, a switch pivotally mounted on said wind driven member and actuated by centrifugal force to deenergize said motor when said wind driven member is rotated faster than a predetermined speed and means for adjustably moving said switch about its pivotal connection to vary said predetermined speed.

In testimony whereof I hereby affix my signature.

WILLIAM F. HIRSCHMAN.